Figure 4:
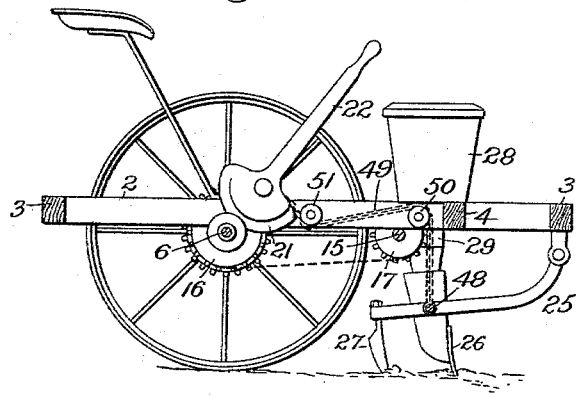

(No Model.)
3 Sheets—Sheet 1.
J. H. ACTON.
CORN PLANTER.
No. 596,971. Patented Jan. 11, 1898.
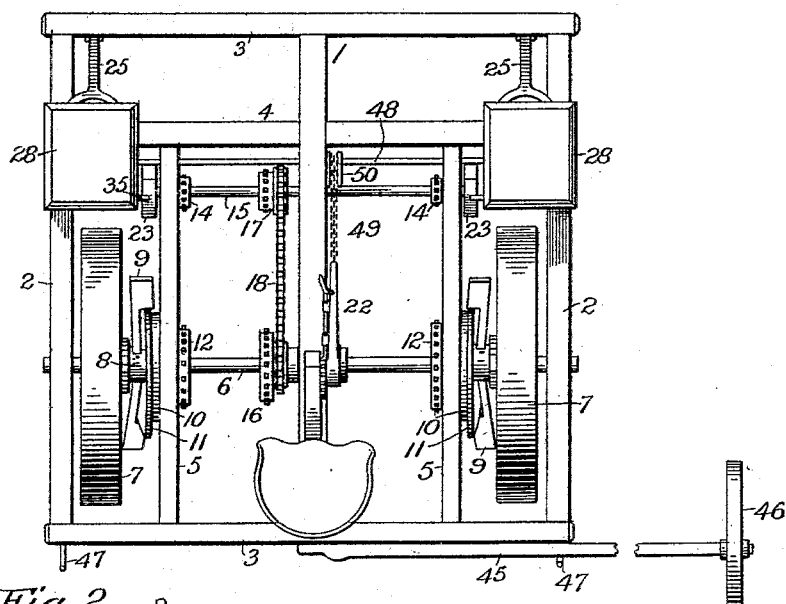
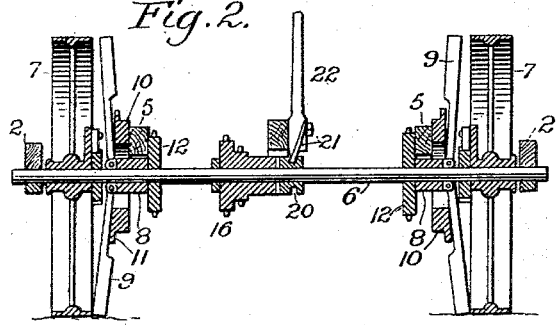
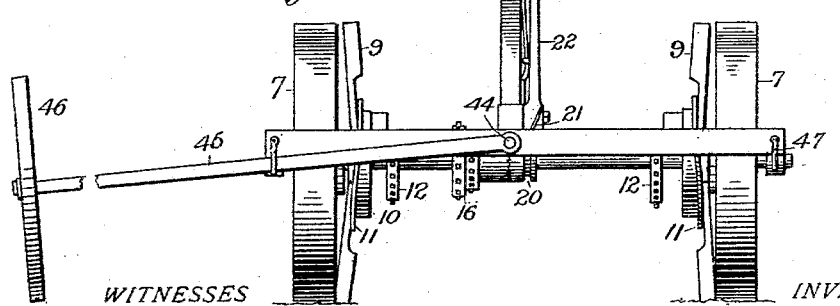
WITNESSES
INVENTOR,
JOHN H. ACTON,
Attorney (No Model.) 3 Sheets—Sheet 2.

J. H. ACTON.
CORN PLANTER.

No. 596,971. Patented Jan. 11, 1898.

WITNESSES
James F. Duhamel.
B. W. Dorsitre.

INVENTOR,
JOHN H. ACTON,
By John Hedderburn
Attorney (No Model.) 3 Sheets—Sheet 3.

J. H. ACTON.
CORN PLANTER.

No. 596,971. Patented Jan. 11, 1898.

WITNESSES

INVENTOR,
JOHN H. ACTON,
By John Shellerburn
Attorney

UNITED STATES PATENT OFFICE.

JOHN H. ACTON, OF PAYNE, OHIO.

CORN-PLANTER.

SPECIFICATION forming part of Letters Patent No. 596,971, dated January 11, 1898.

Application filed January 25, 1897. Serial No. 620,593. (No model.)

*To all whom it may concern:*

Be it known that I, JOHN H. ACTON, a citizen of the United States, residing at Payne, in the county of Paulding and State of Ohio, have invented certain new and useful Improvements in Corn-Planters; and I do hereby declare the following to be a full, clear, and exact description of the invention, such as will enable others skilled in the art to which it appertains to make and use the same.

This invention relates to corn-planters, and has for its object to provide a simple and efficient machine in which the operating means for dropping the seed are connected to and driven from the main driving-axle of the machine, the arrangement being such that the speed at which the dropping devices are actuated may be varied and governed by means of a system of differential sprocket-wheels in connection with a driving-chain.

The detailed objects and advantages of the invention will appear in the course of the subjoined description.

The invention consists in certain novel features and details of construction and arrangement of parts, as will be hereinafter fully described, illustrated in the drawings, and pointed out in the claims.

Figure 5:
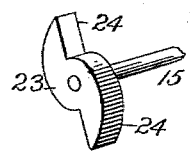
Figure 6:
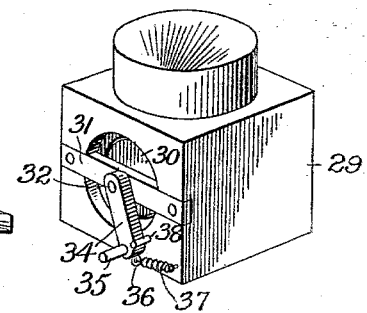
Figure 7:
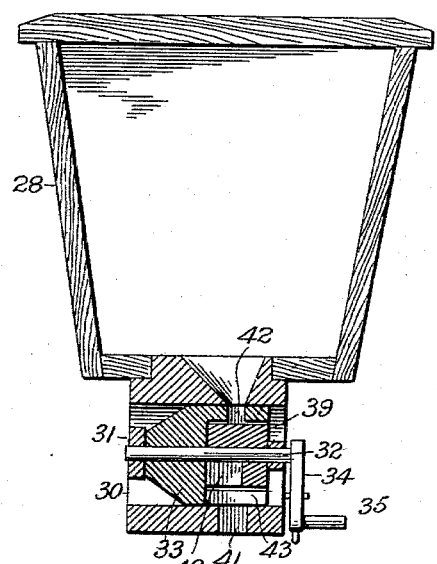
Figure 8:
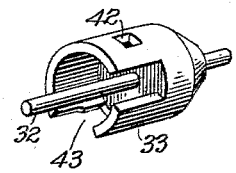
Figure 9:
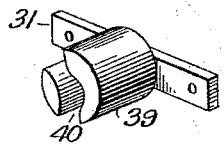
Figure 10:
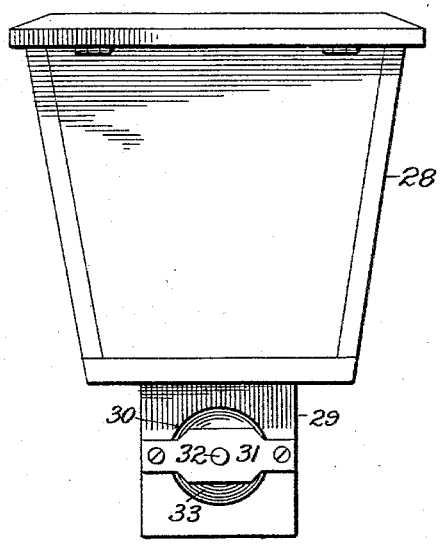
Figure 11:
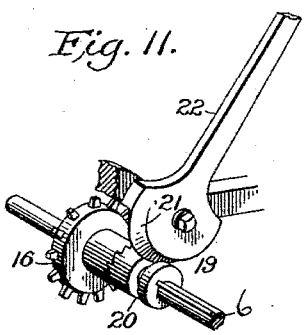
Figure 12:
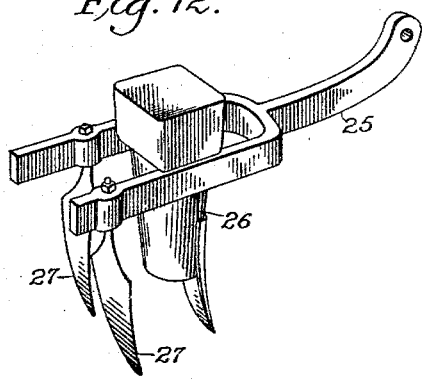

In the drawings, Figure 1 is a plan view of a corn-planter constructed in accordance with the present invention. Fig. 2 is a vertical transverse section through the machine, taken in line with the main driving-axle. Fig. 3 is a rear elevation of the machine. Fig. 4 is a longitudinal section through the machine. Fig. 5 is a detail perspective view showing one of the trips and a portion of the trip-shaft. Fig. 6 is an enlarged detail perspective view of one of the hoppers, showing the operating-crank which is actuated by one of the trips. Fig. 7 is a vertical section through the hopper and casing in which the dropper is mounted. Fig. 8 is a detail perspective view of the oscillating shell of the dropper. Fig. 9 is a similar view of the apertured cylinder around which the shell moves. Fig. 10 is a rear elevation of the hopper and casing of the dropping apparatus. Fig. 11 is a detail perspective view of the clutch-lever. Fig. 12 is a detail view of one of the forks carrying the furrow-openers and shovels.

Similar numerals of reference designate corresponding parts in the several figures of the drawings.

Referring to the drawings, 1 designates the frame of the machine, which is shown as comprising the main longitudinal bars 2, the front and rear cross-bars 3, intermediate cross-bars 4, and auxiliary longitudinal bars 5, extending from the rear cross-bar 3 to the intermediate cross-bars 4.

6 designates the main driving-axle, having carrying or driving wheels 7 mounted thereon and connected thereto by a ratchet, so that they will actuate the mechanism only as the machine is drawn forward and will revolve loosely on the axle when the machine is backed. Arranged just inside of each wheel 7 is a collar 8, surrounding the axle 6 and having oppositely-projecting marking arms or standards 9, pivotally connected thereto on longitudinal axes, whereby the outer ends of said arms are adapted to move toward and away from the rim of the wheel. Connected to each bar 5 on its outer side is a cam-disk 10, the flange 11 of which is deflected toward the wheel 7 at its lower portion, so as to operate on each of the marking-arms 9 for forcing the same outward close to the wheel 7 in the lower portion of the movement of said arm, while during the remainder of the movement of each of said arms 9 the latter may move away from the rim of the wheel 7, so as not to interfere with the rotation thereof.

Mounted upon the axle 6 inside of the bars 5 are sprocket-wheels 12, from which drive-chains may extend forward and around similar sprocket-wheels 14, fast on the trip-shaft 15, extending parallel to the main driving-axle 6. Other sprocket-wheels 16 of different diameters are mounted on the driving-axle 6 and relatively smaller sprocket-wheels 17 are mounted on the trip-shaft 15 and operated from the sprocket-wheels 16 by means of a chain 18, which may be shifted from one set to the other of said differential sprocket-wheels for the purpose of varying the speed at which the trip-shaft 15 is driven. The sprocket-wheels 16 are mounted loosely on the driving-axle and are adapted to be engaged therewith by means of a sliding clutch 19, having a feather or spline connection with said axle and provided with an annular groove 20, in which fits the oblique lower edge or flange 21 of a hand-lever 22, fulcrumed intermediate its ends on the machine-frame and arranged within convenient reach of the driver in his seat on the machine. The driver by operating this hand-lever can throw the dropping mechanism into or out of action whenever desired.

The tripping-shaft 15 is journaled in bearings on the machine-frame and extends transversely thereof and is provided at each end with a rotating trip 23, provided with diametrically opposite shoulders or cam-shaped projections 24 for imparting motion to the dropping mechanism hereinafter described.

Pivotally connected to the machine-frame at its front end and near the opposite sides thereof are two drag-bars 25, carrying in their rear forked ends the furrow-openers 26, which may be of any usual or preferred construction, the extremities of the drag-bars having fixedly attached thereto shovels 27, arranged at each side of the line of travel of the furrow-openers 26, so as to cover in the furrow formed by the furrow-openers in a manner readily understood by those familiar with the art to which this invention appertains. Arranged above each furrow-opener 26, so as to discharge into the same, is a hopper 28, having interposed between it and its respective furrow-opener a casing 29, in which the dropping mechanism is arranged. The casing 29 is provided with a cylindrical bore or cavity 30, extending through the same from side to side. At the ends of said bore or cavity are cross-bars 31, provided with bearing-openings for a shaft 32, upon which is mounted a hollow cylindrical shell 33, the external diameter of which is slightly less than the internal diameter of the bore or cavity 30, so that the shell may be revolved or oscillated therein. The shell 33 is mounted fast on the shaft 32, and this shaft is provided at its inner end with a crank-arm 34, the inbent extremity 35 of which lies across the adjacent trip 23, so as to be actuated thereby. This crank is also provided with an offset 36, from which a spring 37 extends to a fixed point on the casing 29 for normally holding the crank-arm in a certain position, and a stop 38 is arranged on the casing 29 in the path of the crank-arm 34 for limiting the movement thereof in one direction as said arm is retracted by the spring 37.

Within the shell 33 is a stationary block 39, the same being secured to the adjacent cross-bar 31 and surrounding the shaft 32. This cylinder 39 is provided with an inclined or oblique aperture 40, leading through the same and registering at the bottom with a discharge-opening 41 in the bottom of the casing 29. The shell 33 is provided in that side which normally lies uppermost with an opening 42, into which the seed in the hopper may gravitate when said opening is under the discharge end of the hopper, where it is normally held by the spring 37. As the shell 33 is oscillated the opening 42 is brought into alinement with the aperture 40, thus allowing the seed to pass through said aperture until they find lodgment against the lower portion of the shell underlying the lower end of said aperture 40. Upon the return movement of the shell 33 an open space 43 therein is brought into alinement with the discharge end of the aperture 40, thereby allowing the seed to pass downward through the shell and through the discharge-opening 41 in the casing and into the upper end of the furrow-opener, and thence to the ground.

By means of the construction and arrangement shown and described the downward movement of the crank-arm 34 is relatively slow, as said crank-arm is operated upon by the adjacent trip 23, while the return movement of said crank-arms and the shell is much quicker as actuated by the spring 37, thus effecting a rapid dropping of the seed into the furrow-opener, just as said seed would be dropped by hand.

Pivoted centrally to the rear end of the machine-frame upon a horizontal axis 44 is an arm 45, carrying at its outer end a marking-wheel 46. At or near each rear corner of the machine-frame is arranged a ∪-shaped bracket 47, for supporting and steadying the arm 45 when moved to one side or the other of the machine. By means of this construction the arm 45 may be swung to either side of the machine-frame, as desired, to enable the wheel 46 to travel in a furrow previously made or to mark off a new line or track in which one of the driving-wheels or one of the furrow-openers may subsequently be caused to travel for properly spacing the rows.

From the foregoing description it will be seen that by means of the differential sprocket-wheels the number of times the dropper is operated to one revolution of the driving-wheels may be regulated from two to four or more.

It will also be seen that the dropping mechanism may be thrown into and out of operation whenever desired by means of the lever 22. For elevating the furrow-openers and shovels the drag-bars 25 are connected by a cross bar or rod 48, and from this rod a cord or other flexible connection 49 extends over a pulley 50, and thence under a second pulley 51, where it connects to the lever 22, so that simultaneously with the throwing of the dropping mechanism out of operation the driver may lift the furrow-openers and shovels when turning at the end of the field or when going to and from the place of operation.

It will be understood that the machine is susceptible of various changes in the form, proportion, and minor details of construction, which may accordingly be resorted to without departing from the spirit or sacrificing any of the advantages of the invention.

Having thus described the invention, what is claimed as new is—

1. In a corn-planter, the combination with one of the ground-wheels, of a pivoted marker arranged at one side thereof, and means for automatically swinging said marker laterally relatively to said wheels, substantially as described.

2. In a corn-planter, the combination with one of the driving-wheels, of a pivoted marker arranged at one side of said wheel and carried by the driving-axle, and a cam-disk operating on said marker for moving the same relatively to the driving-wheel, substantially as described.

3. In a corn-planter, the combination with one of the driving-wheels and the driving-shaft, of a collar mounted on said shaft at one side of said wheel, oppositely-projecting markers pivotally connected to said collar and extending to the rim of the driving-wheel, and a stationary cam-disk operating on said markers for moving the same relatively to the driving-wheel, substantially as described.

4. In a corn-planter, the combination with the main driving-axle, and the droppers arranged at spaced points, of a transverse rotary trip-shaft arranged in advance of the driving-axle, means operatively connecting said trip-shaft with the driving-axle, whereby the trip-shaft is continuously rotated and cam-trips on said shaft for actuating the droppers, substantially as described.

5. In a corn-planter, the combination with the main driving-axle and a revolving trip-shaft for operating the droppers, arranged parallel to said axle, of cam-shaped trips at the ends of said shaft for actuating the dropper-shafts, a sprocket-wheel on said trip-shaft, a sprocket-wheel mounted loosely on the driving-axle, a sliding clutch on said axle for throwing the sprocket-wheel into and out of engagement therewith, and a hand-lever for moving said clutch, substantially as described.

6. In a corn-planter, the combination with the main driving-axle, of a rotary trip-shaft arranged parallel to and in advance thereof and adapted to actuate the droppers, a sprocket-wheel on the trip-shaft, a sprocket-wheel mounted loosely on the axle, a sliding clutch on said axle adapted to be moved into engagement with the sprocket-wheel thereon, a chain running over said sprocket-wheels, and a hand-lever mounted on the machine-frame and fulcrumed on an axis parallel to said axle and provided with an oblique lower edge or flange coöperating with said sliding clutch, substantially as and for the purpose described.

7. In a corn-planter, the combination with an oscillating dropper mounted in the casing attached to the machine-frame, of a crank-arm for actuating said dropper, having its extremity bent at an angle, a rotary trip-shaft operatively geared to and driven by the main driving-axle, and a cam-shaped trip secured to said shaft and coöperating with the bent end of the crank-arm, substantially as described.

8. In a corn-planter, the combination with one of the driving-wheels, of a pivoted marker arranged at one side of said wheel, and a cam operating on said marker for moving the same relatively to the driving-wheel, substantially as described.

In testimony whereof I have signed this specification in the presence of two subscribing witnesses.

JOHN H. ACTON.

Witnesses:
J. F. BOND,
H. E. RUBIN.